(12) United States Patent
Daneshmand et al.

(10) Patent No.: US 9,754,143 B2
(45) Date of Patent: *Sep. 5, 2017

(54) RADIO FREQUENCY IDENTIFICATION READERS, METHODS AND COMPUTER PROGRAM PRODUCTS FOR ADJUSTING A QUERY COMMAND SLOT-COUNTER PARAMETER Q

(71) Applicant: AT&T Intellectual Property I, L.P., Atlanta, GA (US)

(72) Inventors: Mahmoud Daneshmand, Holmdel, NJ (US); Chonggang Wang, Plainsboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,570

(22) Filed: Jul. 31, 2016

(65) Prior Publication Data

US 2017/0032160 A1    Feb. 2, 2017

Related U.S. Application Data

(63) Continuation of application No. 14/679,058, filed on Apr. 6, 2015, now Pat. No. 9,405,943, which is a (Continued)

(51) Int. Cl.
*H04Q 5/22* (2006.01)
*G08B 13/14* (2006.01)
(Continued)

(52) U.S. Cl.
CPC ....... *G06K 7/10366* (2013.01); *G06K 7/0008* (2013.01); *G06K 7/10029* (2013.01); *G06K 17/0022* (2013.01); *H04Q 9/00* (2013.01); *H04Q 2209/47* (2013.01); *H04Q 2209/753* (2013.01); *H04W 74/0816* (2013.01)

(58) Field of Classification Search
CPC combination set(s) only.
See application file for complete search history.

(56) References Cited

U.S. PATENT DOCUMENTS 6,784,787 B1    8/2004  Atkins et al.
9,000,891 B2    4/2015  Daneshmand et al.
(Continued)

OTHER PUBLICATIONS

Daneshmand, M., "A New Slot-Count Selection Algorithm for RFID Protocol," Aug. 2007, Communications and Networking in China, 2007. CHINACOM '07. Second International Conference on Aug. 22-24, 2007, p. 4, $2^{nd}$ column, formulas annoted under under "(8)" and "(9)".

*Primary Examiner* — Nabil Syed
*Assistant Examiner* — Cal Eustaquio

(57) ABSTRACT

RFID readers and methods for adjusting a query command slot-count parameter Q for use by radio frequency identification (RFID) tag reader in an RFID tag inventory round are provided. A method for adjusting a query command slot-count parameter Q for use by an RFID tag reader includes setting an initial value for Q for a first inventory round, issuing a query command to a population of RFID tags, and monitoring replies from the population of RFID tags. The value of Q is decreased by a first amount if no reply is received, and the value of Q is increased by a second amount different from the first amount if a tag collision reply is received.

20 Claims, 8 Drawing Sheets

Related U.S. Application Data continuation of application No. 12/323,996, filed on Nov. 26, 2008, now Pat. No. 9,000,891.

(51) Int. Cl.
*G06K 7/10* (2006.01)
*G06K 7/00* (2006.01)
*H04Q 9/00* (2006.01)
*G06K 17/00* (2006.01)
*H04W 74/08* (2009.01)

(56) References Cited

U.S. PATENT DOCUMENTS

| | | |
|---|---|---|
| 2005/0280506 A1 | 12/2005 | Lobanov et al. |
| 2007/0126555 A1 | 6/2007 | Bandy |
| 2008/0111664 A1 | 5/2008 | Maguire |
| 2008/0180222 A1 | 7/2008 | Hollister et al. |
| 2008/0266055 A1 | 10/2008 | Turner et al. |
| 2009/0040021 A1 | 2/2009 | Seo et al. |
| 2010/0019883 A1 | 1/2010 | Eom et al. |

RADIO FREQUENCY IDENTIFICATION READERS, METHODS AND COMPUTER PROGRAM PRODUCTS FOR ADJUSTING A QUERY COMMAND SLOT-COUNTER PARAMETER Q

This application is a continuation of U.S. patent application Ser. No. 14/679,058, filed Apr. 6, 2015, now U.S. Pat. No. 9,405,943, which is a continuation of U.S. patent application Ser. No. 12/323,996, filed Nov. 26, 2008, now U.S. Pat. No. 9,000,891, all of which are herein incorporated by reference in their entirety.

BACKGROUND

The present disclosure relates generally to Radio Frequency Identification (RFID) tags and readers, and more particularly, to methods and apparatus for inventorying an RFID tag population.

Radio frequency identification (RFID) has existed for many years. RFID technology is currently being used in many diverse fields including supply chain management, homeland security, military deployment management, the healthcare industry and the airline industry. A conventional RFID system consists of RFID tags or transponders, RFID readers or interrogators, and a database. Each RFID tag consists of a microchip and an embedded antenna that contains a unique identity or Electronic Product Code (EPC). An object or item having an RFID tag affixed thereto is identified when the RFID tag is interrogated by an RFID reader. RFID tags may be classified into active tags, semi-active tags, and passive tags, depending on whether they have embedded power or not and what the embedded power is used for.

An RFID reader conventionally has more than one separate antenna and is responsible for reading RFID tags in the vicinity thereof. The communication between an RFID reader and an RFID tag is established by an air-interface protocol that provides operation modes and procedures for both reader-to-tag and tag-to-reader directions. The air-interface protocol defines the command format, provides synchronous timing between the reader and tags, and determines how the frequency and time resource may be shared by an RFID reader and RFID tags.

Each record of RFID raw data may contain information such as reading time, location, and tag EPC. In business environments, such as a distribution center, many pallets, cases and products having RFID tags attached thereto may arrive during a very short time period and, therefore, massive RFID data flow may be produced. This RFID data typically needs to be managed in an efficient and timely manner. RFID readers usually store some raw data at the front-end of the reading process, producing a filtered RFID database at the end of an interrogation cycle. Conventionally, RFID tags and RFID readers form a front-end communication subsystem, while a database is part of a back-end software subsystem, as shown in FIG. 1.

In the environment shown in FIG. 1, each RFID reader can only interrogate RFID tags within its vicinity or interrogation region. When multiple RFID tags are present within an interrogation region, there are chances that reply signals from these RFID tags may occur simultaneously resulting in "tag collisions." The conventional way to resolve tag collisions is to let an RFID reader repeatedly send query commands after tag collisions occur and instruct the RFID tags or some of them to respond again. The process of RFID tag identification can be viewed as a chain of cycles or rounds.

In each cycle, the RFID reader sends many query commands to identify all existing RFID tags (i.e., all RFID tags within an interrogation region). Within each cycle, an RFID tag that has already been identified will not respond again unless a new cycle is beginning and the RFID reader resets the operations. Because of tag collisions, it may be difficult to identify all existing RFID tags in one cycle. As such, multiple consecutive cycles may be required to guarantee that all or most of the existing RFID tags are successfully identified.

Existing protocols for resolving tag collisions may be classified into two kinds: Tree-Walking-based deterministic algorithms and Aloha-like random algorithms. Tree-Walking-based protocols basically work as follows. An RFID reader sends a first command to query existing RFID tags within an interrogation region. In response, existing RFID tags in the interrogation region respond to the RFID reader. If a tag collision occurs due to more than one RFID tag responding simultaneously, the RFID reader splits the RFID tags into several subsets and sends query commands to query these subsets one-by-one. In a binary tree protocol, each splitting generates two new subsets. If tag collisions continue to occur when querying a subset, the RFID reader splits this subset further into new smaller subsets and again queries these new smaller subsets one-by-one. The splitting is recursively performed until there is only one RFID tag in a new subset and this RFID tag will be successfully identified without any tag collision. By repeating these operations, the RFID reader can identify all RFID tags within an interrogation region. However, because the number of required query commands is dependent on the number of existing RFID tags, this protocol may have limited value.

In conventional Aloha protocol, each RFID tag independently determines its own transmission time, which is a random value, and the transmission can start at any time. If an RFID tag is notified of a collision, it will re-select a random time and attempt retransmission. Unfortunately, conventional Aloha protocol may have low throughput. However, another Aloha protocol, referred to as slotted Aloha protocol, may have higher throughput. In slotted Aloha protocol, time is divided into a sequence of slots and each RFID tag can only start its transmission at the beginning of a slot. The Aloha-based anti-collision algorithms for RFID tags are similar to Framed Slotted Aloha (FSA). In FSA, time is divided into cycles. Each cycle has two parts. The first or control part may have a constant size and is used for RFID reader-to-tag communications. An RFID reader transmits a query command which contains control information to RFID tags within this part. The second or frame part is used for RFID tag-to-reader communications, which consists of a set of slots, which are competed for by RFID tags to send their replies to the RFID reader.

A slotted Aloha-like anti-collision algorithm has been proposed for resolving tag collisions. This algorithm, referred to as EPCglobal RFID Generation-2 (Gen-2) protocol, has an important parameter Q, which determines the maximal number of slots as $2^Q$. In order to make Q adaptively follow the changing number of participating RFID tags, Gen-2 designs an adaptive slot-count (Q) selection algorithm, called adaptive Q algorithm. This algorithm works as follows. When there is no reply from RFID tags, the RFID reader tries to decrease Q. When there is a collided reply, the reader tries to increase Q. However, the algorithm changes the value of Q with the same amount whether there is a "collided reply" or "no reply" from the RFID tags. Unfortunately, this approach may lead to the same probability with which a collided reply and no reply may happen and, in turn, RFID tag identification speed may be reduced.

SUMMARY

RFID readers and methods for adjusting a query command slot-count parameter Q for use by a radio frequency identification (RFID) tag reader in an RFID tag inventory round are provided. According to some embodiments, a method for adjusting a query command slot-count parameter Q for use by an RFID tag reader includes setting an initial value for Q for a first inventory round, issuing a query command to a population of RFID tags, and monitoring replies from the population of RFID tags. The value of Q for use in a second inventory round is adjusted by a first amount if no reply is received, and by a second amount different from the first amount if a tag collision reply is received during the first inventory round.

In some embodiments, the value of Q is decreased by a first amount if no reply is received, and the value of Q is increased by a second amount different from the first amount if a tag collision reply is received. In some embodiments the first amount is less than the second amount. In some embodiments, the first amount is 0.1, and the second amount is the lesser of 1.0 and the value of the formula (0.1)*(Ave_$T_{coll}$/Ave_Tithe). Ave_$T_{coll}$ is the average duration of a collided reply from the population of tags, and Ave_$T_{idle}$ is the average duration of no reply from the population of tags.

According to some embodiments, an RFID reader includes an RFID controller, a transceiver coupled to the RFID controller, and at least one RF antenna coupled to the transceiver. The RF antenna transmits commands received from the RFID controller via the transceiver and receives responses from a population of RFID tags. The RFID controller is configured to set an initial value for Q for a first inventory round, issue a query command to a population of RFID tags, monitor replies from the population of RFID tags, and adjust the value of Q for use in a second inventory round by a first amount if no reply is received, and by a second amount different from the first amount if a tag collision reply is received during the first inventory round.

In some embodiments, the controller decreases the value of Q by a first amount if no reply is received and the controller increases the value of Q by a second amount that is different from the first amount if a tag collision reply is received. In some embodiments, the first amount is less than the second amount. In some embodiments, the first amount is 0.1, and the second amount is the lesser of 1.0 and the value of the formula (0.1) * (Ave_$T_{coll}$/Ave_$T_{idle}$). The RFID reader may include a memory that is arranged to store the initial Q value and any subsequent Q values.

The enhanced slot-count algorithm, according to embodiments, updates Q faster when a collided reply occurs than when there is no reply. An algorithm according to embodiments achieves better performance than the Gen-2 adaptive Q algorithm in terms of tag identification speed. In addition, embodiments can seamlessly be integrated into Gen-2 protocol since it does not make any change to tags and the only requirement is parameter configuration at the RFID reader.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
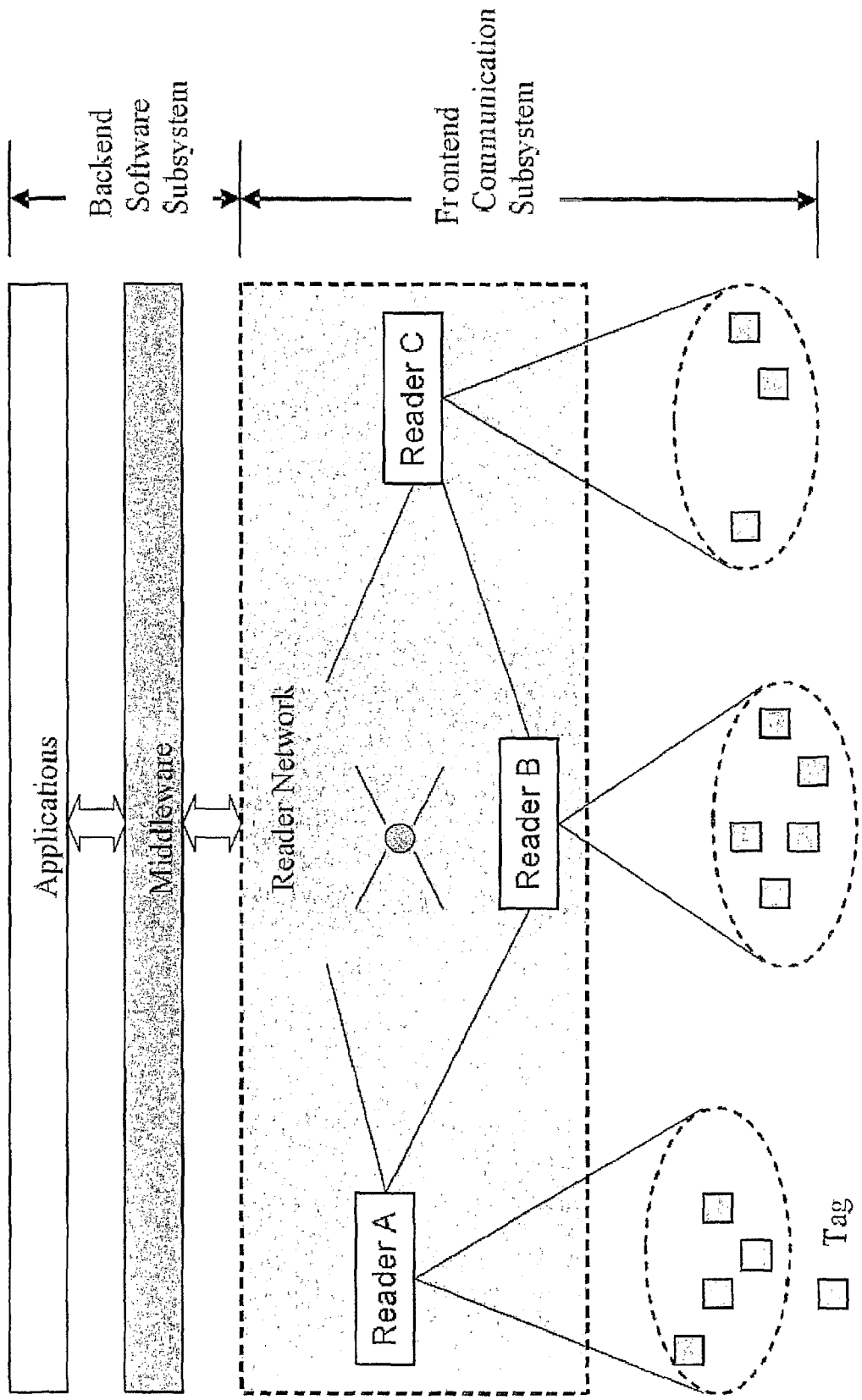
FIG. 1 is a block diagram that illustrates a conventional RFID architecture.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Gen-2 protocol is an air-interface protocol that includes physical and media access control (MAC) specifications for UHF RFID passive tags, which operates in the range of 860 MHz to 960 MHz. This protocol provides advanced features that are designed for fast RFID tag identification, flexibility, and security. The Gen-2 protocol can partition an RFID tag population within an interrogation region into distinct subpopulations so that RFID tags can associate separately and independently with each of a plurality of RFID readers. RFID readers (interrogators) support, and RFID tags provide, four sessions denoted S0, S1, S2, and S3. RFID tags participate in one and only one session during an inventory round. Two or more RFID readers can use sessions to independently inventory a common RFID tag population. RFID readers manage RFID tag populations using three basic operations: Select, Inventory, and Access. Each of these operations consists of one or more commands. Select commands select a particular RFID tag population prior to Inventory. Inventory commands facilitate inventorying/identifying RFID tags prior to Access. Access commands are used to read from or write to individual RFID tags. With Gen-2, capacity of a radio link between the RFID tags and the RFID reader can be adjusted. For example, Gen-2 offers various tag-to-reader data rates (referred to as "TRrate") through using flexible and configurable modulation in the tag-to-reader direction. Gen-2 provides 32-bit password protected access control and designs Kill and Lock commands for security consideration.

Figure 3:
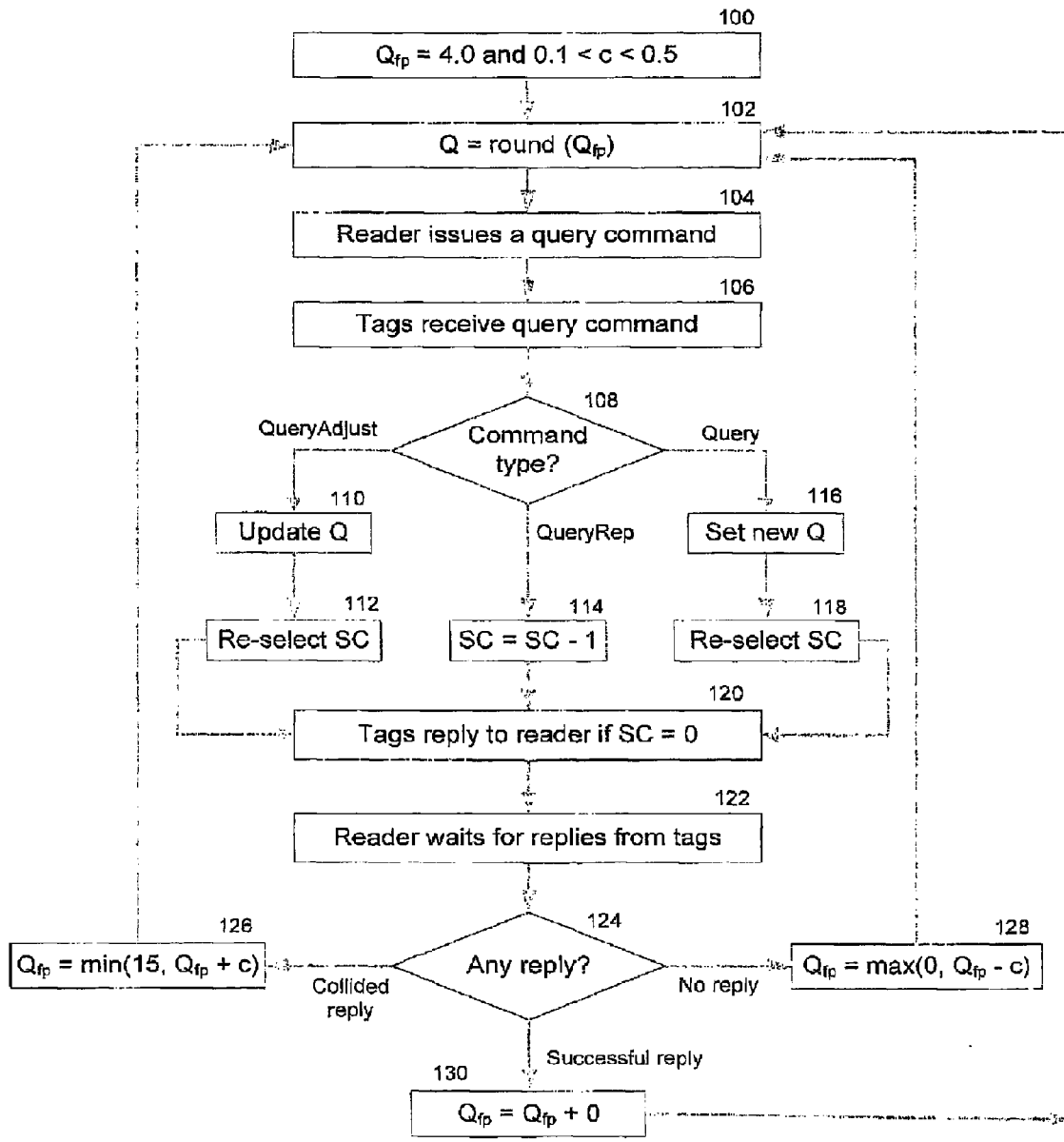
FIG. 3 is a flow chart of operations for a conventional Gen-2 adaptive Q algorithm.

Referring to FIG. 3, the RFID tag identification process under Gen-2 consists of a number of inventory rounds. An inventory round is defined as the period between successive Query commands issued by an RFID reader. Thus, the issuing of a new Query command (Block 104) implies the ending of a current inventory round and the beginning of new inventory round. An RFID reader can issue a Query command when the system is powered up or when the channel is idle; therefore, if there are no RFID tags identified in a particular round, the RFID reader can issue a Query command to start a new inventory round. During each inventory round, the RFID reader issues a set of QueryAdjust, or QueryRep commands to identify RFID tags within an interrogation region. When an RFID tag is identified in a particular inventory round, the RFID tag will cease to respond to commands from the RFID reader in the same round.

Each time there is an inventory round, a parameter is used that is called the Query command slot-count parameter "Q". An RFID tag reader communicates Q to the RFID tags in a population, and the RFID tags use Q to respond. In particular, each RFID tag uses its random number generation for Q to arrive at a binary number between 0 and $2^Q-1$. Some RFID tags may choose the same number. Some numbers may not be chosen by any RFID tags.

The term "slot" refers to the available numbers between 0 and $2^Q-1$, which may be chosen by the RFID tags. Once the contents corresponding to the slots are generated based on RFID tag replies (chosen by one or more RFID tags, or not chosen), the RFID reader can evaluate the slots and determine a new Q. Then, the reader requests another round of random numbers from the tags based on the new Q until all tags are inventoried.

Gen-2 protocol defines three types of query commands: Query, QueryAdjust, and QueryRep. The Query command carries the value of parameter Q and initiates an inventory round. The Query command triggers each RFID tag to select a random number and store it in its Slot Counter (SC) (Block 116). The QueryAdjust command is used to instruct all RFID tags to adjust the value of Q (Block 110), reselect a new random number, and update their SC (Block 112). With the QueryAdjust command, Q is either incremented by 1, decremented by 1, or remains unchanged. The QueryRep command is used by an RFID reader to notify all tags to decrement their SC by 1 (Block 114). Those RFID tags which contain SC=0, will decrement to 7FFF. In summary, the Query and QueryAdjust commands inform all RFID tags of the latest Q value and trigger them to reselect SC (Blocks 118, 112), while the QueryRep command instructs RFID tags to decrement their SC by 1 (Block 114).

The sending of a Query command by an RFID reader (Block 104) implies that a new inventory round has begun. Within an inventory round, several QueryAdjust and/or QueryRep commands can be transmitted by an RFID reader in order to identify the remaining RFID tags. A Query command can be issued when the system is powered on or if there are no replies from the RFID tags. Both the QueryAdjust and QueryRep commands can be issued either after an RFID tag is successfully identified, or a channel is in collision.

Figure 2:
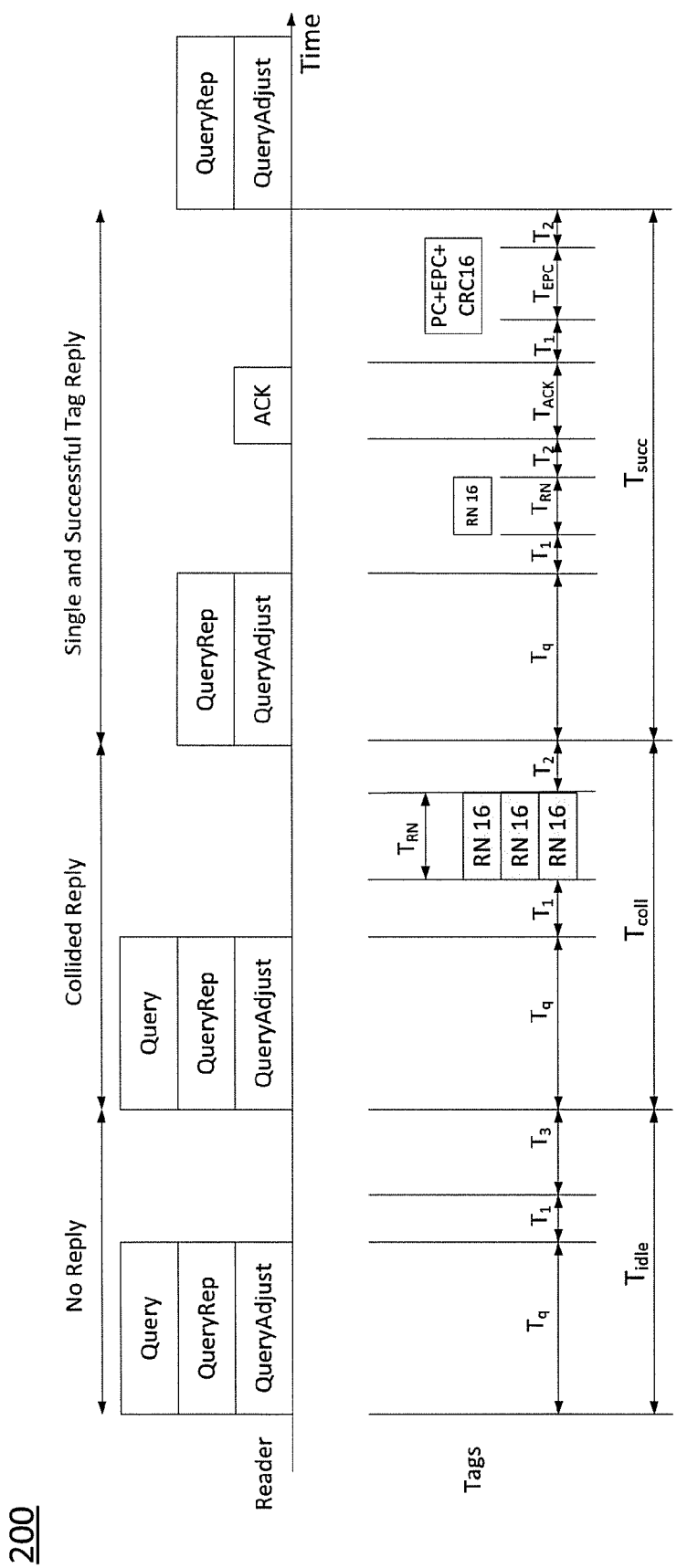
FIG. 2 is a block diagram that illustrates RFID tag identification process and timing relationship in the Gen-2 protocol.

The basic operations of an RFID tag identification process under Gen-2 is illustrated in FIG. 2 and are summarized below:

Reader→Tags: An RFID reader initiates the process of an inventory round by sending a Query command (Block 104, FIG. 3) to the population of RFID tags it has selected to participate in the round. The Query command sends an integer-valued parameter Q and instructs the RFID tags to independently select a random integer from the uniform distribution [0, 2–1] and respond a 16-bit random number (RN16) to the RFID reader if 0 is chosen. The RFID reader waits for replies from the RFID tags.

Tags→Reader: RFID tags' responses to the RFID reader lead to either a Success (S) or a Failure (F). It is a Success if exactly one RFID tag has selected number 0 (Block 120, FIG. 3), and thus, that RFID tag has being identified by the RFID reader. Otherwise, it is a Failure and no RFID tag has been identified.

Reader←⇆Tag: If Success, then the RFID reader sends an acknowledgement (ACK) command back to the identified RFID tag. The identified RFID tag processes the received ACK command and reports its EPC back to the RFID reader.

Reader←→Tags: Whether either Success or Failure, the RFID reader continues with new query commands (Query, QueryAdjust, or QueryRep) (Block 108, FIG. 3) to identify remaining and newly arriving RFID tags.

How RFID tags respond to the RFID reader is dependent on and controlled by the RFID reader's commands. Since all RFID tags respond independently, collisions could occur among RFID tags' responses to the RFID reader. For this reason, a slotted random anti-collision algorithm is used to resolve collisions. The following is a summary of the Gen-2 slotted random anti-collision algorithm. Upon receiving a Query or QueryAdjust command, each RFID tag deposits an integer-valued number in its slot counter, which is an integer selected at random from a uniform distribution $[0, 2^Q-1]$, where Q is an integer-valued parameter. Q varies in the [0, 15] range, and is designated and adjusted by the RFID reader. The value of Q is embedded in the Query command, and updated using the QueryAdjust command (Block 110, FIG. 3). After selecting the random number, RFID tags which have SC=0 respond to the RFID reader command (Block 120, FIG. 3). As shown in FIG. 2, if there is a collided or successful reply (Block 124, FIG. 3), the RFID reader continues to issue QueryRep or QueryAdjust; if there is no reply, the RFID reader could send a Query, QueryAdjust, or a QueryRep command. These commands will instruct unidentified RFID tags to either reselect or reduce their SC, or to restart and choose a new SC with a new Q value.

The conventional adaptive Q algorithm shown in FIG. 3 is used by an RFID reader to update Q based on "Successful Reply", "Collided Reply" or "No Reply." The RFID reader triggers the algorithm as soon as it receives either a "Reply" or its waiting time T1+T3 has expired without a reply from the RFID tags ("No Reply"). The "Reply" is either a "Successful Reply" or a "Collided Reply." $Q_{fp}$ denotes the float-point representation of Q. The value of Q is determined based on the integer nearest to Qfp. The detailed operation is as follows.

Successful Reply: This means that only one RFID tag has selected SC=0 and that the current value of Q seems optimal. In this case, $Q_{fp}$ and Q remains unchanged (Block 130).

Collided Reply: This is due to the fact that more than one RFID tag has selected SC=0, which in turn could imply that Q is too small and that the number of remaining RFID tags is too large. In this case $Q_{fp}$ is incremented by the value of parameter c, a real number (Block 126). After this operation, if $Q_{fp}$ exceeds 15, it is set to 15. The value of Q is the integer that is nearest to Qfp, that is: Q=round ($Q_{fp}$) (Block 102).

No Reply: This can be due to the fact that none of the RFID tags has selected SC=0, which in turn could imply that Q is too large and that the number of remaining RFID tags is too small. In this case $Q_{fp}$ is decremented by the same value of the parameter c (the same value as that of the Collided Reply) (Block 128). After this operation, if $Q_{fp}$ is negative, Qfp=0. Then the value of Q is Q=round ($Q_{fp}$) (Block 102).

As illustrated in FIG. 3, the initial value of Q is Q0=4 (Block 100). The typical values for c are in the range of (0.1, 0.5) (Block 100). A small c value is used when Q is large and a large c value is used when Q is small. Since c<1, there are three possibilities after each update: Q increments by 1, Q decrements by 1, or Q remain unchanged. The RFID reader uses the QueryAdjust command to notify tags of the updated Q.

The term Nc is used to denote the number of collided replies in an inventory round and the term Ni is used to denote how many times no reply occurs in a round. The terms $T_{coll}$ and $T_{idle}$ represent the duration of a collided reply and the duration of no reply, respectively. As shown in FIG. 2, $T_{coll}$ and $T_{idle}$ can be written as:

$$T_{coll}=Tq+T1+T_{RN}+T2, \quad (1)$$

$$T_{idle}=Tq+T1+T3, \quad (2)$$

where T1 is the time from RFID reader transmission to RFID tag response; T2 is the time from RFID tag response to RFID reader transmission; T3 is the time the RFID reader waits, after T1, before it issues another query command. T1, T2 and T3 are three constants and their typical values are given in Table 1 below. $T_{RN}$ is the time taken to transmit a 16-bit random number (RN) from an RFID tag to an RFID reader including Tag-to-Reader Preamble (TRPRE) and End-of-Signaling (TREOS). Tq in equations (1) and (2) above is the time taken by the RFID reader to send out a query command including reader-to-tag Preamble (RTPRE) or Frame Sync Sequence (RTFSS). Because Gen-2 defines three types of query commands that have different bit length, Tq could have three different values: Tq1, Tq2 and Tq3, which denote the transmission time of a Query, QueryRep and QueryAdjust command, respectively. As a result, either Tcoll or Tidle could have three different values in an inventory round. The arithmetic average is used to calculate the mean value of Tcoll and Tidle as follows:

$$\text{Ave}\_T_{coll}=(Tq2+Tq3)/2+T1+T_{RN}+T2, \quad (3)$$

$$\text{Ave}\_T_{idle}=(Tq2+Tq3)/2+T1+T3, \quad (4)$$

In equations (3) and (4), the assumption is made that there is the same number of QueryRep and QueryAdjust in an inventory round. The Query command is neglected since only one Query is issued during each inventory round. According to Gen-2, Tq2, Tq3, and $T_{RN}$ are calculated as:

$$Tq2=\text{RTPRE}+\text{RTFSS}+L_{QueryRep}/\text{RTrate}, \quad (5)$$

$$Tq3=\text{RTPRE}+\text{RTFSS}+L_{QueryAdjust}/\text{RTrate}, \quad (6)$$

$$T_{RN}=\text{TRPRE}+\text{TREOS}+L_{RN16}/\text{TRrate}, \quad (7)$$

where RTrate stands for reader-to-tag data rate and TRrate denotes tag-to-reader data rate. $L_{QueryRep}$ (=4 bits) is the length of QueryRep command; $L_{QueryAdjust}$ (=9 bits) is the length of QueryAdjust command; $L_{RN16}$ (=16 bits) is the length of RN16 message. The values of RTPRE (or R=>T Preamble (RTP)), RTFSS, (or R=>T FrameSync), TRPRE, (or T=>R Preamble) and TREOS (or T=>R End-of-Signaling) are given in Table 1 below.

According to Gen-2 protocol, "$T_{RN}+T2$" is usually larger than "T3". Therefore, $T_{coll}$ (or Ave_$T_{coll}$) is longer than $T_{idle}$ (or Ave_$T_{ide}$). Since $T_{idle}$ is smaller than $T_{coll}$, Q can be adjusted in a way to increase the number of idle replies ($N_i$) while decreasing the number of collided replies ($N_c$), thereby improving RFID tag identification speed.

Figure 4:
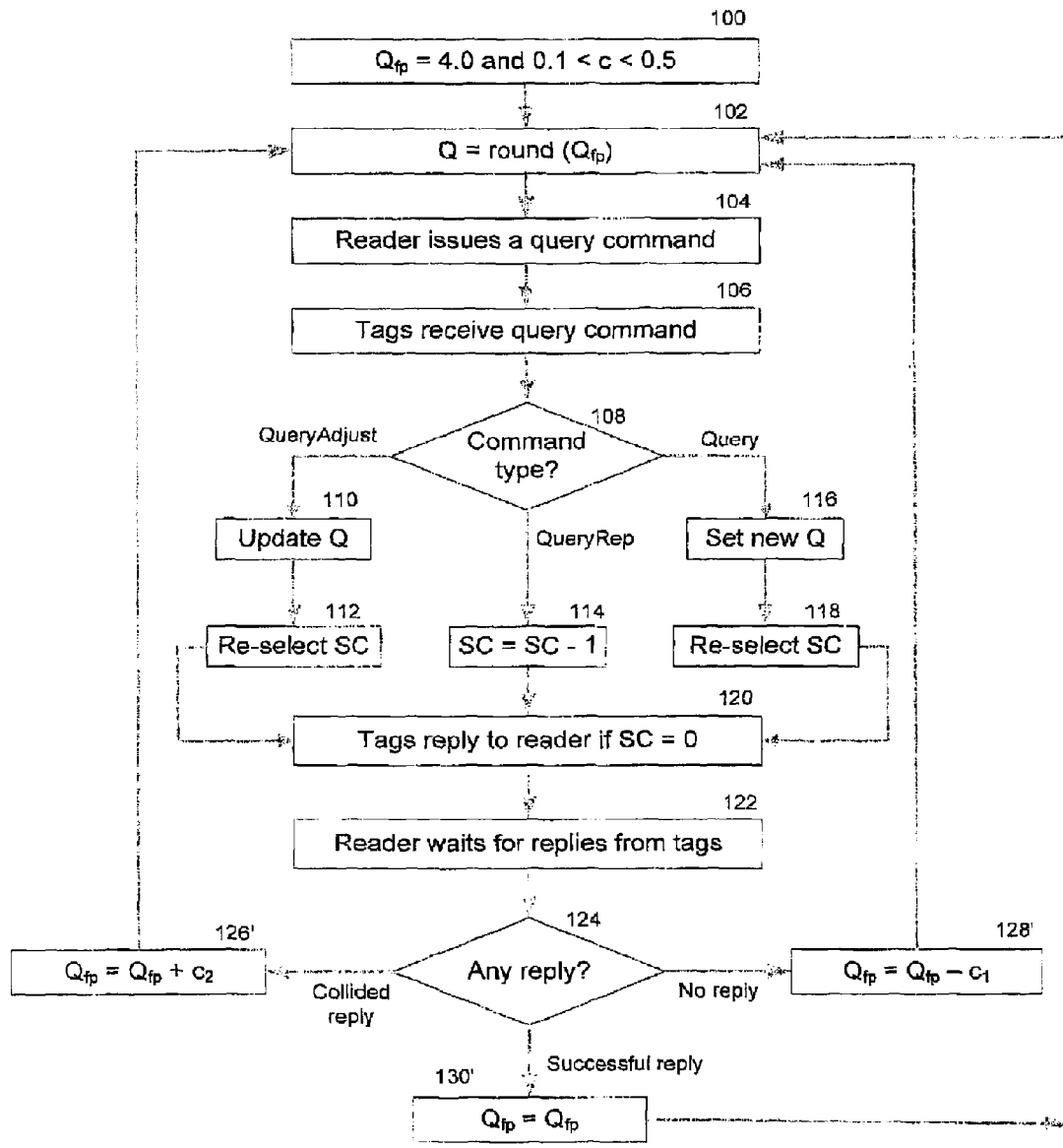
FIG. 4 is a flow chart of operations for a Gen-2 adaptive Q algorithm, according to some embodiments.
Figure 5A:
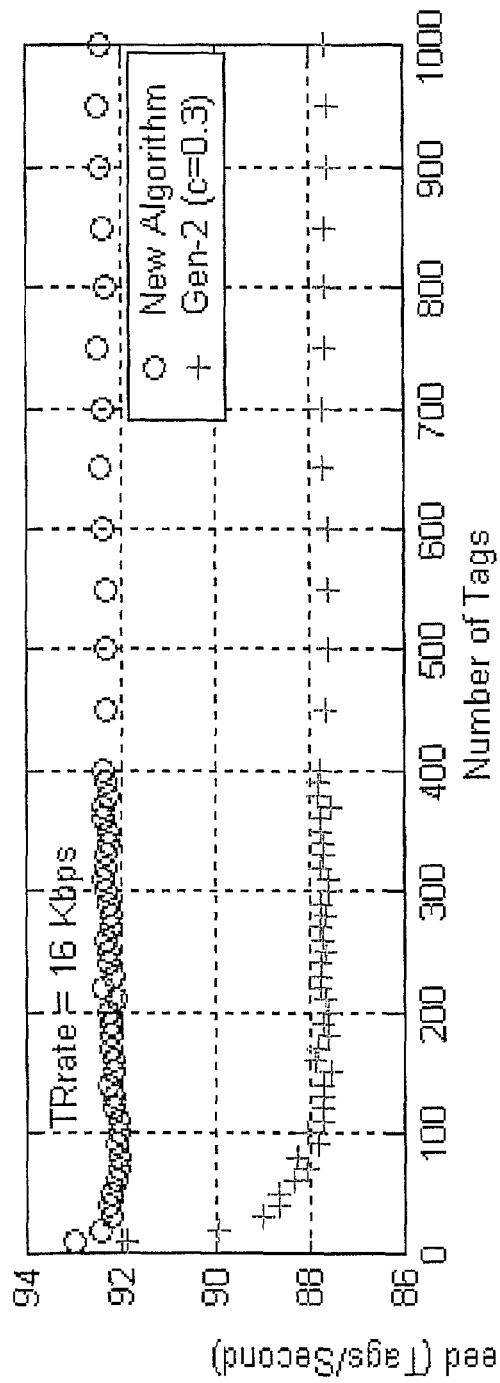
FIGS. 5A-5D illustrate that the Gen-2 adaptive Q algorithm, according to some embodiments, achieves higher RFID tag identification speed than conventional Gen-2 adaptive Q algorithms.
Figure 5B:
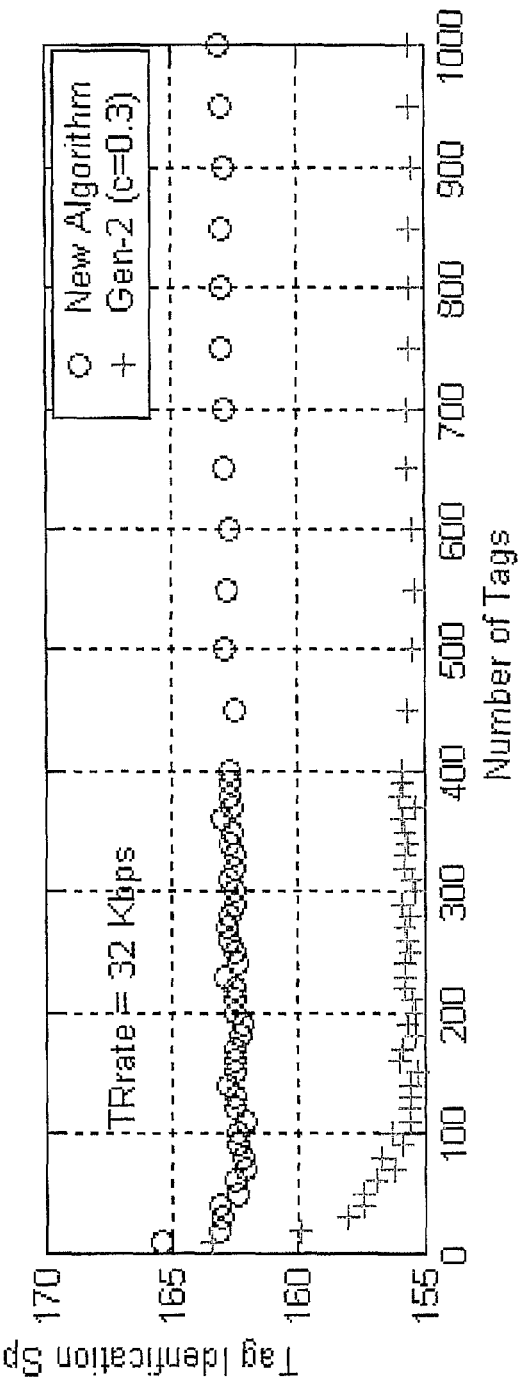
Figure 5C:
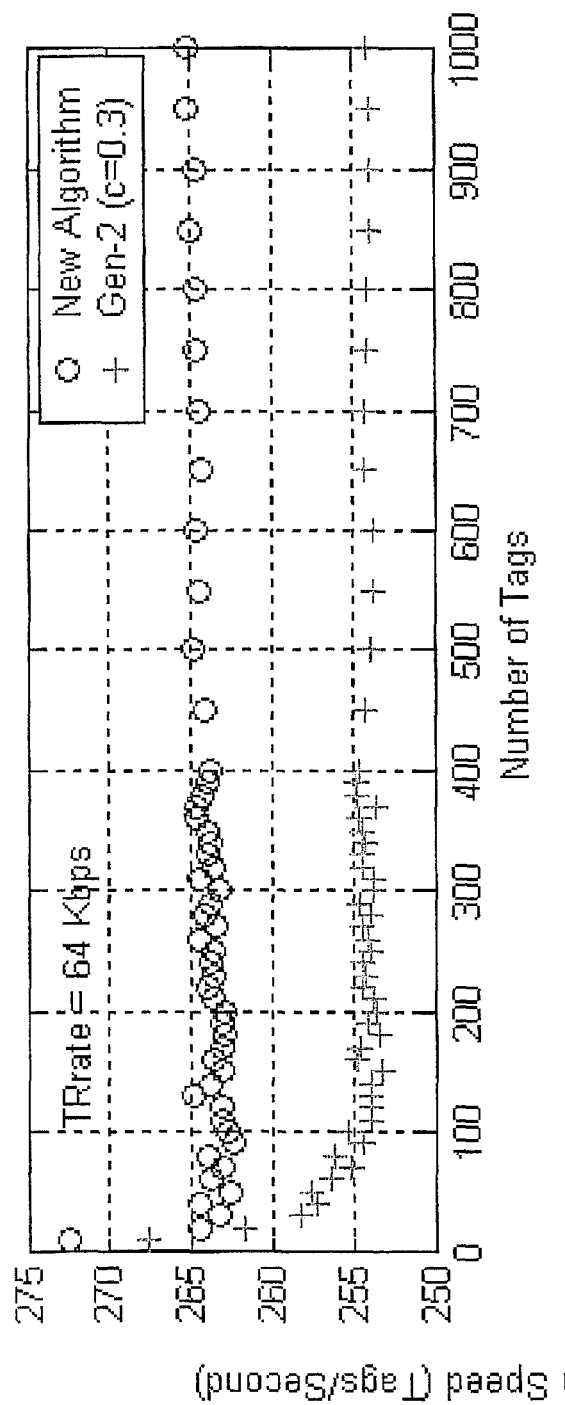
Figure 5D:
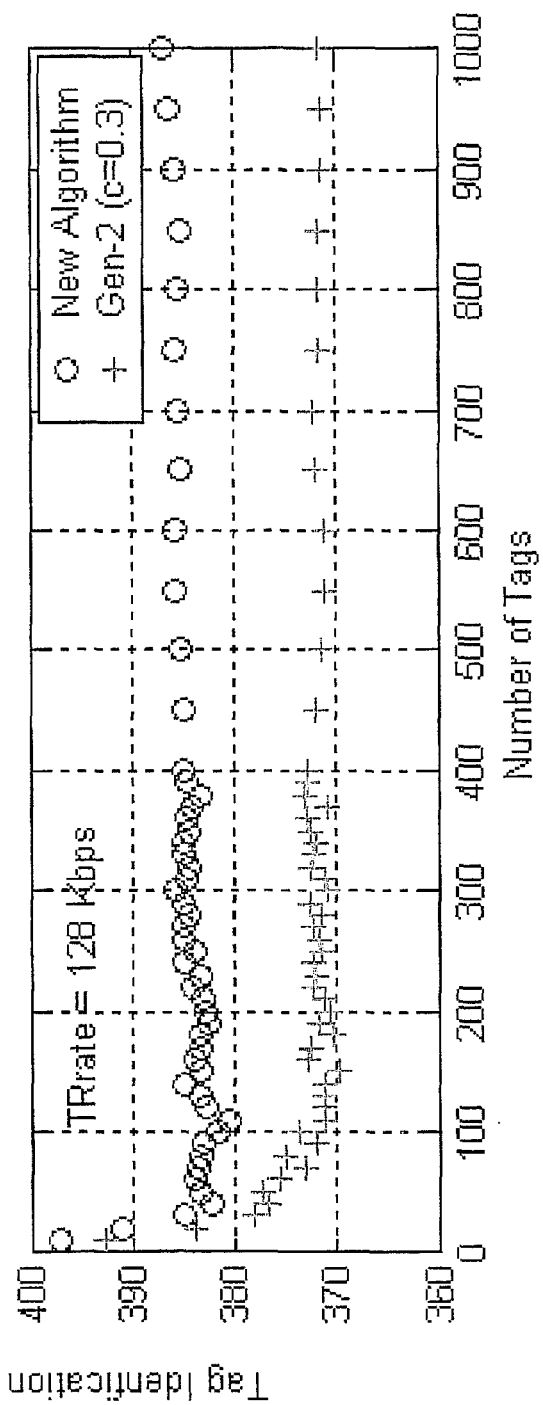

Referring to FIG. 4, a Gen-2 adaptive Q algorithm (Blocks 126'-130'), according to some embodiments, is illustrated. In FIG. 4, Q is adjusted in a manner similar to that illustrated in FIG. 3 with the following changes: 1) when there is no reply, $Q_{fp}=Q_{fp}$-c1 (Block 128'); 2) when there is a collided reply, $Q_{fp}=Q_{fp}$+c2 (Block 126'); and 3) when there is a successful reply, $Q_{fp}=Q_{fp}$ (Block 130'). Here, c1 and c2 are determined as follows:

$$c1=0.1, \quad (8)$$

$$c2=\min(1.0, c1*\text{Ave}\_T_{coll}/\text{Ave}\_T_{idle}). \quad (9)$$

In conventional Gen-2, c1=c2=c. However, according to exemplary embodiments, c2>c1. This makes it easy for an RFID reader to obtain Ave_$T_{coll}$ and Ave_$T_{idle}$ and to calculate c2. As such, according to exemplary embodiments, no change is imposed on RFID tags and no overload is imposed at the RFID reader.

TABLE 1

| Parameters | Value |
|---|---|
| TARI | 12.5 us |
| DATA0 | 1.0*TARI = 12.5 us |
| DATA1 | 1.5*TARI = 18.75 us |
| RTrate | 64 Kbps |
| RTcal | 31.25 us |
| TRcal | 62.5 us |
| DR | 8 |
| LF | DR/TRcal = 128 KHz |
| M | 1, 2, 4, 8 |
| TRate | LF/M = 128, 64, 32, 16 Kbps |
| $T_{pri}$ | 1/LF |
| T => R Preamble | $6*T_{pri}$ |
| T => R End-of-Signaling | $2*T_{pri}$ |
| Delimiter | 12.5 us |
| R => T Preamble (RTP) | Delimiter + DATA0 + RTcal + TRcal |
| R => T FrameSync | RTP − TRcal |
| $T_1$ | Max(RTcal, $10*T_{pri}$) |
| $T_2$ | $5*T_{pri}$ |
| $T_3$ | $5*T_{pri}$ |
| EPC | 96 bits |
| $Q_0$ | 4 |

EXPERIMENTAL RESULTS

Simulations were setup as follows: 1) RTrate is fixed at 64 Kbps and TRrate has four values-16, 32, 64, and 128 Kbps; 2) The number of RFID tags Nt varies between 10 and 1000; below Nt=400, increments are 10 while between Nt=400 and 1000 the increments are 50. All Nt tags are identified in one inventory round; 3) channel with zero bit error rate is assumed; 4) when there is a collided reply, the RFID reader sends QueryAdjust; when there is a successful reply, the RFID reader issues QueryRep; when there is no reply, the RFID reader uses QueryRep if Q has no change or QueryAdjust if Q gets changed. The typical values of other system parameters are given in Table 1 above.

Figure 6:
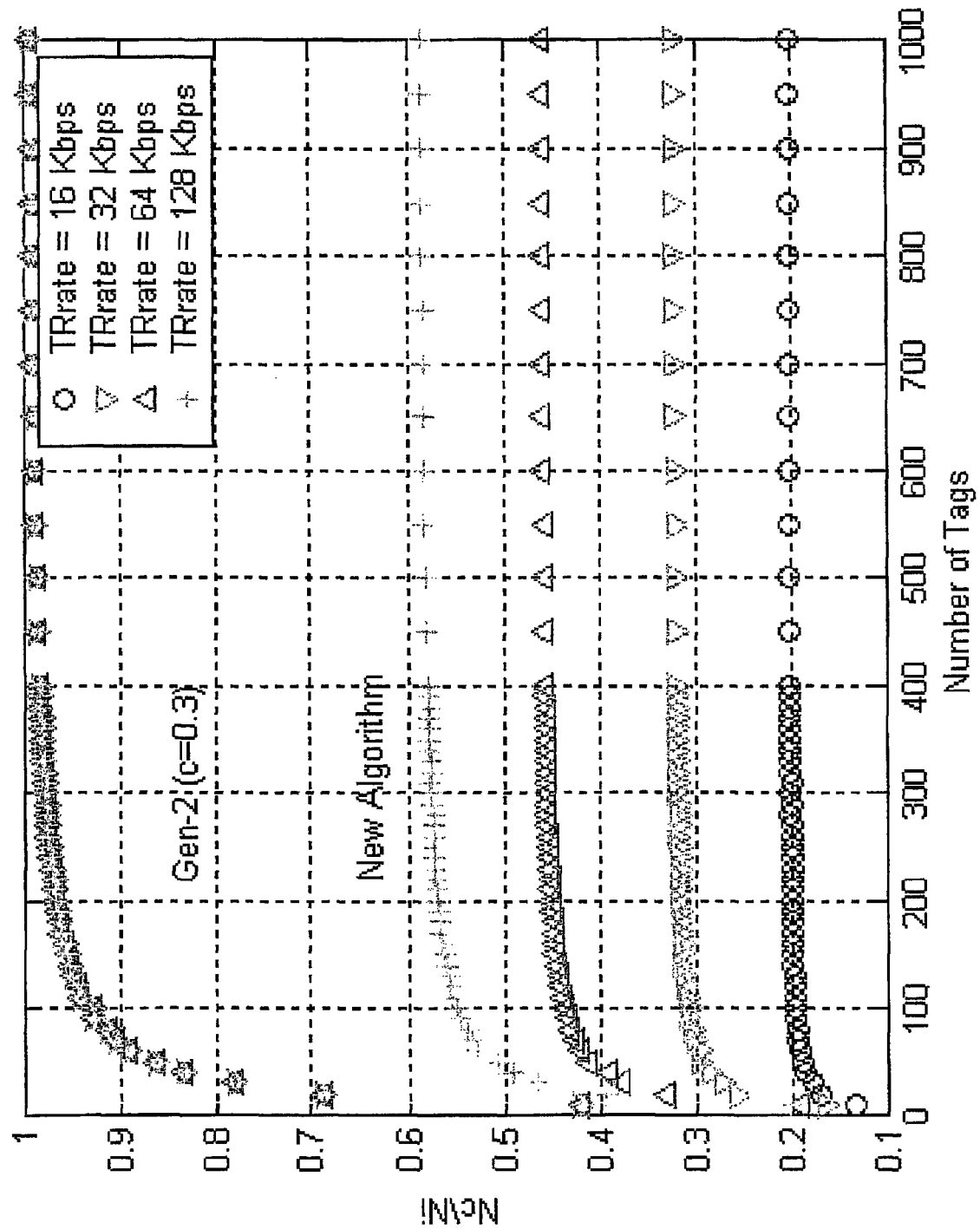
FIG. 6 illustrates the ratio of the number of collided replies ($N_c$) over the number of idle replies ($N_i$) for conventional Gen-2 adaptive Q algorithms and for the Gen-2 adaptive Q algorithm, according to some embodiments.

RFID tag identification speed (TIS) is defined as the ratio of the total number of identified RFID tags over the total time consumed. One hundred (100) rounds were run for each given Nt and the mean value was taken. As shown in FIGS. 5A-5D and 6, the exemplary embodiments achieve higher RFID tag identification speed than the Gen-2 adaptive Q algorithm, especially when the number of RFID tags is large. In addition, FIG. 6 depicts the ratio of Nc over Ni for Gen-2 and the algorithm according to exemplary embodiments, respectively. In Gen-2, Nc and Ni are close and nearly identical when the number of RFID tags are large. According to exemplary embodiments, Nc is much smaller than Ni, which leads to a higher TIS.

Figure 7:
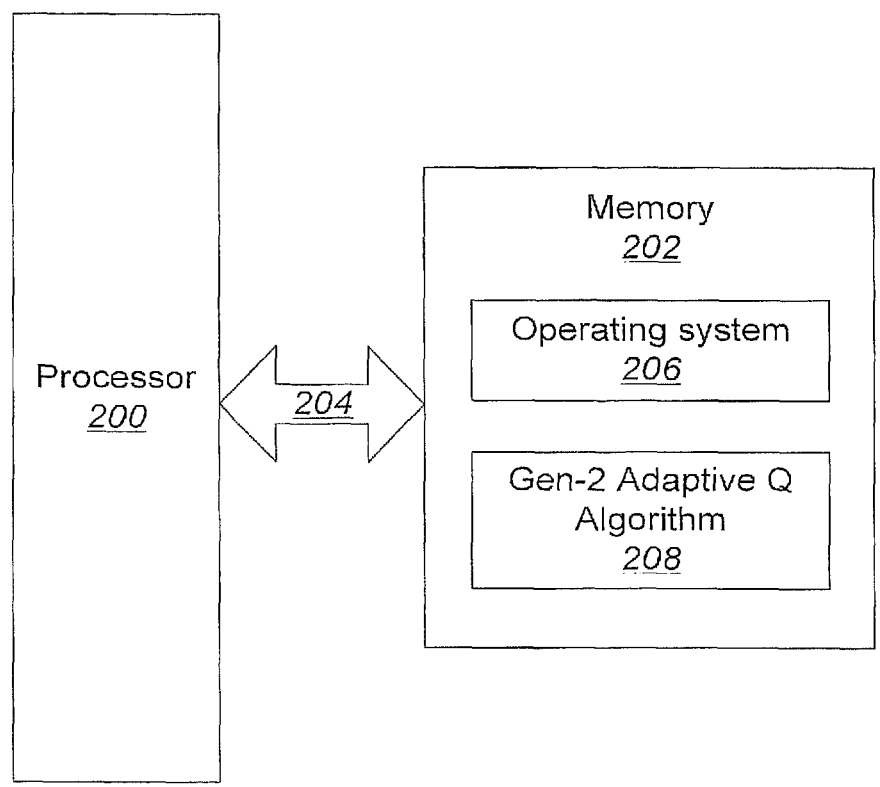
FIG. 7 illustrates an exemplary controller and memory that may be used by an RFID reader, according to some embodiments.

FIG. 7 illustrates an exemplary processor 200 and memory 202 that may be used by an RFID reader, according to some embodiments. The processor 200 communicates with the memory 202 via an address/data bus 204. The processor 200 may be, for example, a commercially available or custom microprocessor. The memory 202 is representative of the overall hierarchy of memory devices containing the software and data used to implement a controller for adjusting a query command slot-count parameter Q for use by an RFID tag reader in an RFID tag inventory round, in accordance with some embodiments. The memory 202 may include, but is not limited to, the following types of devices: cache, ROM, PROM, EPROM, EEPROM, flash, SRAM, and DRAM.

As shown in FIG. 7, the memory 202 may hold various categories of software and data: an operating system 206, and a Gen-2 adaptive Q algorithm module 208. The operating system 206 controls operations of the controller for adjusting a query command slot-count parameter Q for use by an RFID tag reader in an RFID tag inventory round. In particular, the operating system 206 may manage the resources of a device or systems and may coordinate execution of various programs (e.g., the Gen-2 adaptive Q algorithm module 208, etc.) by the processor 200.

The Gen-2 adaptive Q algorithm module 208 comprises logic for increasing or decreasing the value of Q based on RFID tag replies during an inventory round, as described above.

Many variations and modifications can be made to the preferred embodiments without substantially departing from the principles of the present invention. All such variations and modifications are intended to be included herein within the scope of the present invention, as set forth in the following claims.

The invention claimed is:

1. A method comprising:
issuing, via a processor, a query command comprising an initial value for a query command slot-count parameter for a first inventory round to a plurality of radio frequency identification tags;
identifying, via the processor, replies from the plurality of radio frequency identification tags; and
adjusting, via the processor, the initial value of the query command slot-count parameter for use in a second inventory round by a first amount if no reply is received for the query command that is issued, and by a second amount different from the first amount if a tag collision reply is received for the query command that is issued, wherein the second amount is a lesser of 1.0 and a value of a formula $(0.1)*(Ave\_Tcoll/Ave\_Tidle)$, wherein Ave_Tcoll is an average duration of a collided reply from the plurality of radio frequency identification tags, and wherein Ave_Tidle is an average duration of no reply from the plurality of radio frequency identification tags, wherein the Ave_T coll is in a range of 581 microseconds to less than 1456 microseconds.

2. The method of claim 1, wherein the adjusting the initial value of the query command slot-count parameter by the first amount when no reply is received comprises decreasing the initial value of the query command slot-count parameter.

3. The method of claim 1, wherein the adjusting the initial value of the query command slot-count parameter by the second amount when the tag collision reply is received comprises increasing the initial value of the query command slot-count parameter.

4. The method of claim 1, wherein the first amount is less than the second amount.

5. The method of claim 1, further comprising:
storing in a memory the initial value of the query command slot-count parameter and subsequent values of the query command slot-count parameter.

6. The method of claim 1, wherein the adjusting comprises decreasing the initial value of the query command slot-count parameter for use in the second inventory round by the first amount when no reply is received for the query command that is issued.

7. The method of claim 1, wherein the adjusting comprises increasing the initial value of the query command slot-count parameter for use in the second inventory round by the second amount when the tag collision reply is received for the query command that is issued, wherein the first amount is less than the second amount.

8. The method of claim 1, wherein the processor decreases the initial value of the query command slot-count parameter when no reply is received.

9. A tangible computer readable medium storing a plurality of instructions which, when executed by a processor, causes the processor to perform operations, the operations comprising:
issuing a query command comprising an initial value for a query command slot-count parameter for a first inventory round to a plurality of radio frequency identification tags;
identifying replies from the plurality of radio frequency identification tags; and
adjusting the initial value of the query command slot-count parameter for use in a second inventory round by a first amount if no reply is received for the query command that is issued, and by a second amount different from the first amount if a tag collision reply is received for the query command that is issued, wherein the second amount is a lesser of 1.0 and a value of a formula $(0.1)*(Ave\_Tcoll/Ave\_Tidle)$, wherein Ave_Tcoll is an average duration of a collided reply from the plurality of radio frequency identification tags, and wherein Ave_Tidle is an average duration of no reply from the plurality of radio frequency identification tags, wherein the Ave_T coll is in a range of 581 microseconds to less than 1456 microseconds.

10. The tangible computer readable medium of claim 9, wherein the adjusting comprises decreasing the initial value of the query command slot-count parameter for use in the second inventory round by the first amount when no reply is received for the query command that is issued.

11. The tangible computer readable medium of claim 9, wherein the adjusting comprises increasing the initial value of the query command slot-count parameter for use in the second inventory round by the second amount when the tag collision reply is received for the query command that is issued, wherein the first amount is less than the second amount.

12. The tangible computer readable medium of claim 9, wherein the first amount is less than the second amount.

13. The tangible computer readable medium of claim 9, wherein the adjusting the initial value of the query command slot-count parameter by the first amount when no reply is received comprises decreasing the initial value of the query command slot-count parameter.

14. The tangible computer readable medium of claim 9, wherein the adjusting the initial value of the query command slot-count parameter by the second amount wherein the tag collision reply is received comprises increasing the initial value of the query command slot-count parameter.

15. The tangible computer readable medium of claim 9, further comprising:
storing in a memory the initial value of the query command slot-count parameter and subsequent values of the query command slot-count parameter.

16. A radio frequency identification reader, comprising:
a processor of a radio frequency identification controller;
a transceiver coupled to the radio frequency identification controller;
a radio frequency antenna coupled to the transceiver;
wherein the radio frequency antenna transmits a command received from the processor of the radio frequency identification controller via the transceiver and receives responses from a plurality of radio frequency identification tags; and
wherein the processor of the radio frequency identification controller performs operations, the operations comprising:
  issuing a query command comprising an initial value for a query command slot-count parameter for a first inventory round to a plurality of radio frequency identification tags;
  identifying replies from the plurality of radio frequency identification tags; and
  adjusting the initial value of the query command slot-count parameter for use in a second inventory round by a first amount if no reply is received for the query command that is issued, and by a second amount different from the first amount if a tag collision reply is received for the query command that is issued, wherein the second amount is a lesser of 1.0 and a value of a formula $(0.1)*(Ave\_Tcoll/Ave\_Tidle)$, wherein Ave_Tcoll is an average duration of a collided reply from the plurality of radio frequency identification tags, and wherein Ave_Tidle is an average duration of no reply from the plurality of radio frequency identification tags, wherein the Ave_T coll is in a range of 581 microseconds to less than 1456 microseconds.

17. The radio frequency identification reader of claim 16, wherein the controller decreases the initial value of the query command slot-count parameter when no reply is received.

18. The radio frequency identification reader of claim 16, wherein the controller increases the initial value of the query command slot-count parameter when the tag collision reply is received.

19. The radio frequency identification reader of claim 16, wherein the first amount is less than the second amount.

20. The radio frequency identification reader of claim 16, further comprising:
a memory for storing the initial value of the query command slot-count parameter and subsequent values of the query command slot-count parameter.

* * * * *